US010838400B2

(12) United States Patent
Anderson et al.

(10) Patent No.: US 10,838,400 B2
(45) Date of Patent: Nov. 17, 2020

(54) TOOLPATH GENERATION BY DEMONSTRATION FOR COMPUTER AIDED MANUFACTURING

(71) Applicant: Autodesk, Inc., San Rafael, CA (US)

(72) Inventors: Fraser Anderson, Newmarket (CA); George William Fitzmaurice, Toronto (CA); Justin Matejka, Newmarket (CA)

(73) Assignee: Autodesk, Inc., San Rafael, CA (US)

( * ) Notice: Subject to any disclaimer, the term of this patent is extended or adjusted under 35 U.S.C. 154(b) by 150 days.

(21) Appl. No.: 16/013,781

(22) Filed: Jun. 20, 2018

(65) Prior Publication Data

US 2019/0391561 A1 Dec. 26, 2019

(51) Int. Cl.
*G05B 19/4099* (2006.01)
(52) U.S. Cl.
CPC ........... *G05B 19/4099* (2013.01); *G05B 2219/35134* (2013.01); *G05B 2219/49007* (2013.01)
(58) Field of Classification Search
CPC ...... G05B 19/4099; G05B 2219/35134; G05B 2219/49007
See application file for complete search history.

(56) References Cited

U.S. PATENT DOCUMENTS

| | | | |
|---|---|---|---|
| 2005/0063596 A1* | 3/2005 | Yomdin | G06T 9/20 382/232 |
| 2006/0217037 A1* | 9/2006 | Kalanovic | B24B 27/0023 451/5 |
| 2010/0312470 A1* | 12/2010 | Chen | G01C 21/30 701/532 |
| 2016/0154400 A1* | 6/2016 | Mizuno | G05B 19/31 700/187 |
| 2018/0114368 A1* | 4/2018 | Marketsmueller | G06F 3/0482 |

(Continued)

OTHER PUBLICATIONS

Anderson, "Objective Surgical Skill Evaluation," (2010) University of Alberta, Department of Computing Science, 105 pages.

(Continued)

*Primary Examiner* — Thomas C Lee
*Assistant Examiner* — Charles Cai
(74) *Attorney, Agent, or Firm* — Fish & Richardson P.C.

(57) ABSTRACT

Methods, systems, and apparatus, including medium-encoded computer program products, for computer aided design and manufacture of physical structures using toolpath generation by demonstration include, in one aspect, a method including: receiving a user specified path traced in reference to geometry of a modeled object to be manufactured by a computer-controlled manufacturing system, wherein the user specified path is a spatial representation of a desired toolpath; synthesizing candidate toolpaths for the geometry of the modeled object using variations of at least one toolpath parameter; measuring similarities between the candidate toolpaths and the user specified path, including comparing at least a spatial similarity between the candidate toolpaths and the user specified path; suggesting at least some of the candidate toolpaths based on the measured similarities; and determining a toolpath for use when manufacturing the modeled object in accordance with user input regarding the at least some of the candidate toolpaths.

19 Claims, 3 Drawing Sheets

(56) References Cited

U.S. PATENT DOCUMENTS

2019/0009412 A1* 1/2019 Khan .................... B25J 9/1697
2019/0039316 A1* 2/2019 Su .......................... G06T 19/20
2019/0384258 A1* 12/2019 Nordell .............. G05B 19/4099

OTHER PUBLICATIONS

Ding et al., "Querying and Mining of Time Series Data: Experimental Comparison of Representations and Distance Measures," Proceedings of the VLDB Endowment (2008) 1(2):1542-1552.

Vaughan and Gabrys, "Comparing and Combining Time Series Trajectories Using Dynamic Time Warping," Procedia Computer Science (2016) 96:465-474.

Unknown author, "PowerMill Getting Started Tutorial," (Sep. 4, 2017) [online] (retrieved from https://knowledge.autodesk.com/support/powermill/getting-started/caas/simplecontent/content/powermill-getting-started-tutorial.html), 10 pages.

Unknown author, "Learning—Adaptive Clearing Toolpaths," (May 30, 2018) [online] (retrieved from http://help.autodesk.com/view/fusion360/ENU/?guid=GUID-E9EBAB0B-5DF4-4168-BA58-AEA055D980F5), 7 pages.

* cited by examiner

TOOLPATH GENERATION BY DEMONSTRATION FOR COMPUTER AIDED MANUFACTURING

BACKGROUND

This specification relates to computer aided design and manufacture of physical structures, such as using additive and/or subtractive manufacturing systems and techniques.

Computer Aided Design (CAD) software and Computer Aided Manufacturing (CAM) software has been developed and used to generate 3D representations of objects and to manufacture the physical structures of those objects, e.g., using Computer Numerical Control (CNC) manufacturing techniques. Additive manufacturing, also known as solid free form fabrication or three-dimensional (3D) printing, refers to any manufacturing process where 3D objects are built up from raw material (generally powders, liquids, suspensions, or molten solids) in a series of two-dimensional layers or cross-sections. An example of additive manufacturing is Fused Filament Fabrication (FFF). A 3D extrusion printer typically uses FFF to lay down material, such as a plastic filament or metal wire that is unwound from a coil, in layers to produce a 3D printed object. Further, subtractive manufacturing refers to any manufacturing process where 3D objects are created from stock material (generally a "blank" or "workpiece" that is larger than the 3D object) by cutting away portions of the stock material.

Selecting toolpaths in CAM software can be difficult for novice users. CNC mills may have several axes and capabilities, and the geometry being machined may have a complex form that requires particular routing paths. Existing methods of selecting toolpaths involves the user knowing which of the categories of toolpaths are most appropriate, selecting that category, and manipulating many (often dozens) of parameters to achieve the desired result. However, even when users are given cues as to what types of toolpaths to use, it is not always evident which category of toolpath to select, and so users can often spend hours exploring the various categories and parameters trying to find their desired toolpath.

SUMMARY

This specification describes technologies relating to computer aided design and manufacture of physical structures using toolpath generation by demonstration, e.g., for use with additive and/or subtractive manufacturing systems and techniques.

In general, one or more aspects of the subject matter described in this specification can be embodied in one or more methods that include: receiving, in a computer aided design or manufacturing program, a user specified path traced in reference to geometry of a modeled object to be manufactured by a computer-controlled manufacturing system, wherein the user specified path is a spatial representation of a desired toolpath to be used by the computer-controlled manufacturing system; synthesizing candidate toolpaths for the geometry of the modeled object using variations of at least one toolpath parameter; measuring similarities between the candidate toolpaths and the user specified path, the measuring including comparing at least a spatial similarity between the candidate toolpaths and the user specified path; suggesting at least some of the candidate toolpaths based on the measured similarities; and determining a toolpath for use by the computer-controlled manufac- turing system when manufacturing the modeled object in accordance with user input regarding the at least some of the candidate toolpaths.

The one or more methods can be implemented using a non-transitory computer-readable medium encoding instructions operable to cause data processing apparatus to perform operations of the one or more methods. Thus, a system can include a data processing apparatus including at least one hardware processor; and a non-transitory computer-readable medium encoding instructions configured to cause the data processing apparatus to perform operations of the one or more methods. Further, the system can include the computer-controlled manufacturing system used to build a physical structure of the modeled object using the determined toolpath.

These and other implementations can optionally include one or more of the following features. The geometry of the modeled object can be a user selected portion of a three dimensional model of the object presented by the computer aided design or manufacturing program. User input can be received through a virtual reality computer system that visualizes the geometry of the modeled object in a three dimensional space of the virtual reality computer system. User input can be received through a display device that represents the geometry of the modeled object in a two dimensional space of the display device.

The at least one toolpath parameter can include a category of toolpath shape, and the synthesizing can include simulating different toolpath categories for the geometry of the modeled object. The at least one toolpath parameter can include feed and speed parameters for tool operation, and the synthesizing can include simulating use of different values for the feed and speed parameters within at least one toolpath category. The at least one toolpath parameter can include a combination of two or more toolpaths, and the synthesizing can include simulating use of different ordering for the two or more toolpaths using one or more tools and one or more toolpath categories.

The user specified path can be a spatial and temporal representation of the desired toolpath to be used by the computer-controlled manufacturing system, and the measuring can include comparing timing of the candidate toolpaths and the user specified path. The measuring can include comparing variations in timing occurring within each respective candidate toolpath to variations in timing occurring within the user specified path. The measuring can include comparing an ordering of two or more toolpaths.

The determining can include using a user selected one of the at least some of the candidate toolpaths. The suggesting can include presenting the at least some of the candidate toolpaths ranked in order of the measured similarities. The method can include receiving, in the computer aided design or manufacturing program, a user specified path for movement, during the manufacturing of the modeled object, of a physical material used to form the modeled object. Moreover, the computer-controlled manufacturing system can include one or more computer processing apparatus including at least one non-transitory computer-readable medium encoding the computer aided design or manufacturing program.

Particular embodiments of the subject matter described in this specification can be implemented to realize one or more of the following advantages. A user is allowed to specify a toolpath directly by demonstrating a desired toolpath. The user's demonstration can be used to synthesize candidate toolpaths for the user to select from, which can reduce the time needed to make a manufacturing plan and reduce the time needed to manufacture parts. The user experience can be improved for the person designing the toolpath. Moreover, by making the process more accessible, a larger population of users can be enabled to design toolpaths.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
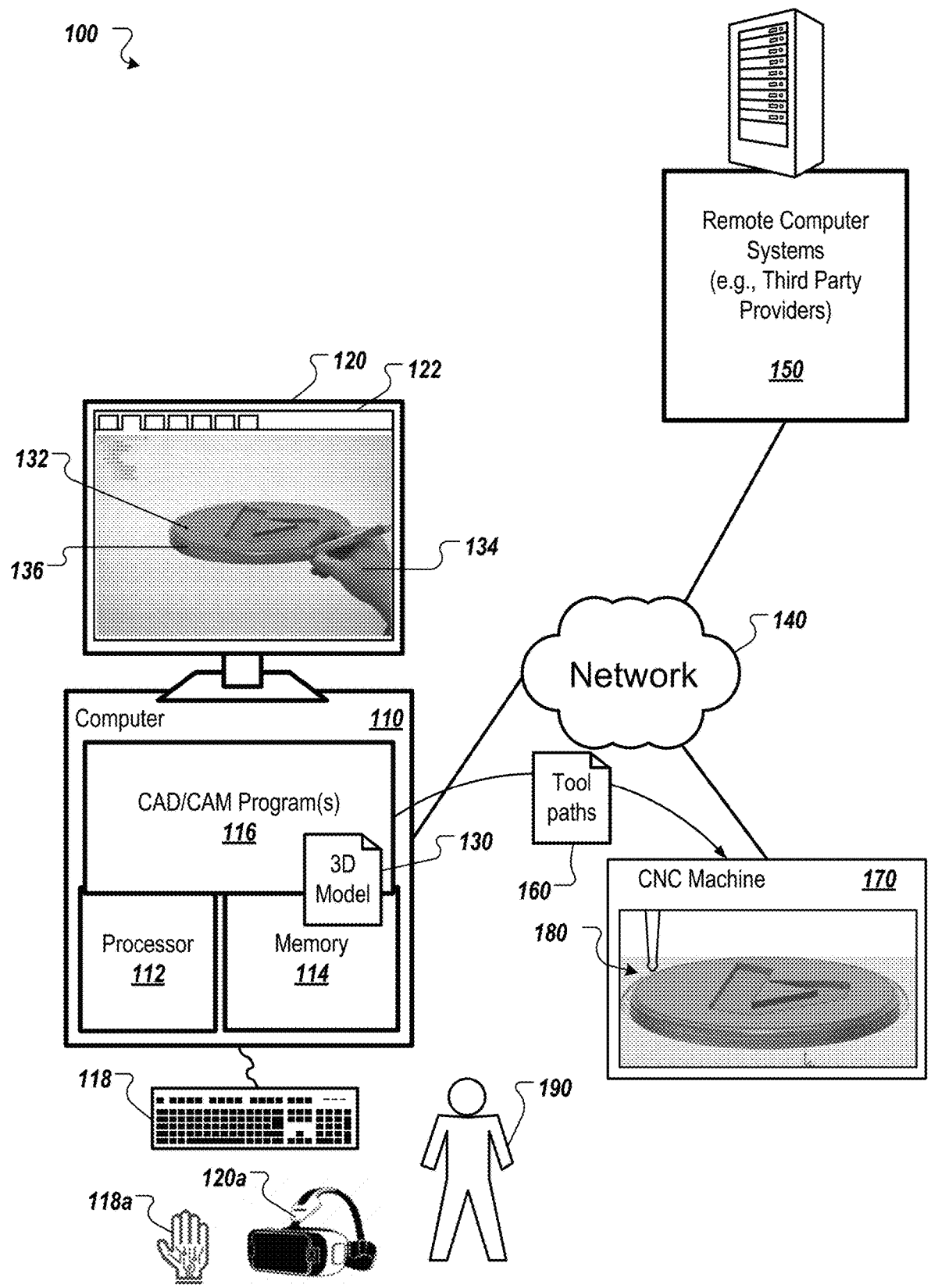
FIG. 1 shows an example of a system usable to design and manufacture physical structures.

FIG. 1 shows an example of a system 100 usable to design and manufacture physical structures. The examples discussed below often refer to subtractive manufacturing machines, but the invention is not limited to use with subtractive manufacturing systems. For example, the systems and techniques described herein can be used with various types of additive manufacturing (AM) and three dimensional (3D) printing, in addition to Computer Numerical Control (CNC) milling, CNC laser cutting, etc.

A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more 3D modeling, simulation and manufacturing control programs such as Computer Aided Design (CAD) and/or Computer Aided Manufacturing (CAM) program(s) 116, also referred to as Computer Aided Engineering (CAE) programs, etc. The program(s) 116 can run locally on computer 110, remotely on a computer of one or more remote computer systems 150 (e.g., one or more third party providers' one or more server systems accessible by the computer 110 via the network 140) or both locally and remotely. The CAD/CAM program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer or in virtual reality (VR) or augmented reality (AR) system. For example, the input/output devices 118, 120 can include a VR input glove 118a and a VR headset 120a.

A user 190 can interact with the program(s) 116 to create and/or load a 3D model 132 (e.g., from a document 130) of an object 180 to be manufactured by a computer-controlled manufacturing system, e.g., by a CNC machine 170, such as a multi-axis, multi-tool milling machine, a laser or water jet cutter, a 3D printer, etc. This can be done using known graphical user interface tools, and the 3D model 132 can be defined in the computer using various known 3D modeling formats, such as using solid models (e.g., voxels) or surface models (e.g., B-Rep (Boundary Representation), surface meshes). In addition, the user 190 can interact with the program(s) 116 to modify the 3D model 132 of the object 180, as needed.

Once the 3D model 132 of the object 180 is ready to manufacture, the 3D model 132 can be prepared for manufacturing the physical structure of the object 180 by generating toolpaths for use by the computer-controlled manufacturing system to manufacture the object 180. For example, the 3D model 132 can be used to generate a toolpath specification document 160, which can be sent to the CNC machine 170 and used to control operation of one or more milling tools. This can be done upon request by the user 190, or in light of the user's request for another action, such as sending the 3D model 132 to the CNC machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the program(s) 116 can create one or more toolpaths in the document 160 and provide the document 160 (of an appropriate format) to the CNC machine 170 to create the physical structure of the object 180 (note that in some implementations, the computer 110 is integrated into the CNC machine 170, and so the toolpath specification document 160 is created by the same computer that will use the toolpath specification document 160 to manufacture the object 180). The program(s) 116 can include in the UI 122 a series of menus that allow the user 190 to specify a type of toolpath (e.g., both 2D and 3D toolpaths, as well as general toolpath shapes, such as adaptive clearing, pocket clearing, parallel, contour, ramp, horizontal, pencil, scallop, spiral, radial, morphed spiral, etc.) and parameters therefor (e.g., spindle speed, surface speed, ramp spindle speed, cutting feedrate, feed per tooth, lead-in feedrate, lead-out feedrate, ramp feedrate, plunge feedrate, feed per revolution, etc.). However, relying solely on such a menuing approach can be very laborious if the user 190 is not familiar with the many different options for toolpath specification.

Note that even inexperienced users 190 often have an intuition about the rough shape of a toolpath that would work well. For example, as shown in FIG. 1, the 3D model 132 is of a disk, and the user 190 may intuitively understand that a toolpath that spirals outward would work well in filleting the edge of the disk 132. Thus, the program(s) 116 provide a user interface that allows the user 190 to demonstrate 134 (e.g., in a rough fashion) a desired toolpath by tracing a path 136 in reference to geometry of the 3D model 132 (e.g., freehand drawing or sketching of what the toolpath should look like). The referenced geometry can be various portions of the 3D model 132, including a user selected portion of the 3D model 132. The user input demonstration 134 can be received through a mouse 118 (or other input device) interacting with a display device 120 that represents the geometry of the 3D model 132 in a two dimensional space of the display device 120. In some implementations, the user input 134 is received through a VR computer system that visualizes the geometry of the 3D model 132 in a three dimensional space of the virtual reality computer system (e.g., using VR input glove 118*a* and VR headset 120*a*).

The user specified path 136 is a spatial (and potentially also temporal) representation of the desired toolpath to be used in computer-controlled manufacturing of the object 180. Note that in addition to (or alternative to) the use of freehand drawing input tool(s), other drawing input tools (e.g., a circle/oval drawing tool, a spline drawing tool, etc.) can be used to obtain the user specified path 136. In general, any 2D or 3D input system or technique that allows specification of a spatial trajectory (or a series of 2D or 3D points) can be used to indicate a desired tool path.

With the provided user specified path 136, the program(s) 116 can generate different toolpath specifications by varying toolpath parameters, and then compare those generated toolpath specifications to the user specified path 136 using a number of similarity measures. A reduced number of the generated toolpath specifications (those that are most similar to the user specified path 136) can then be presented to the user 190 for determination of a final desired toolpath. This simplifies the process of specifying toolpaths in the software 116 as the user need not experiment with and manipulate dozens of parameters to try and achieve the desired toolpath. Often, the effect of the parameters is not clear, and toolpaths must be generated, simulated and viewed for the user to gain an understanding. Thus, by allowing the user to demonstrate a desired toolpath, the toolpath specification process is accelerated, which can reduce the time needed to make a manufacturing plan and likewise reduce the time needed to manufacture parts.

Figure 2:
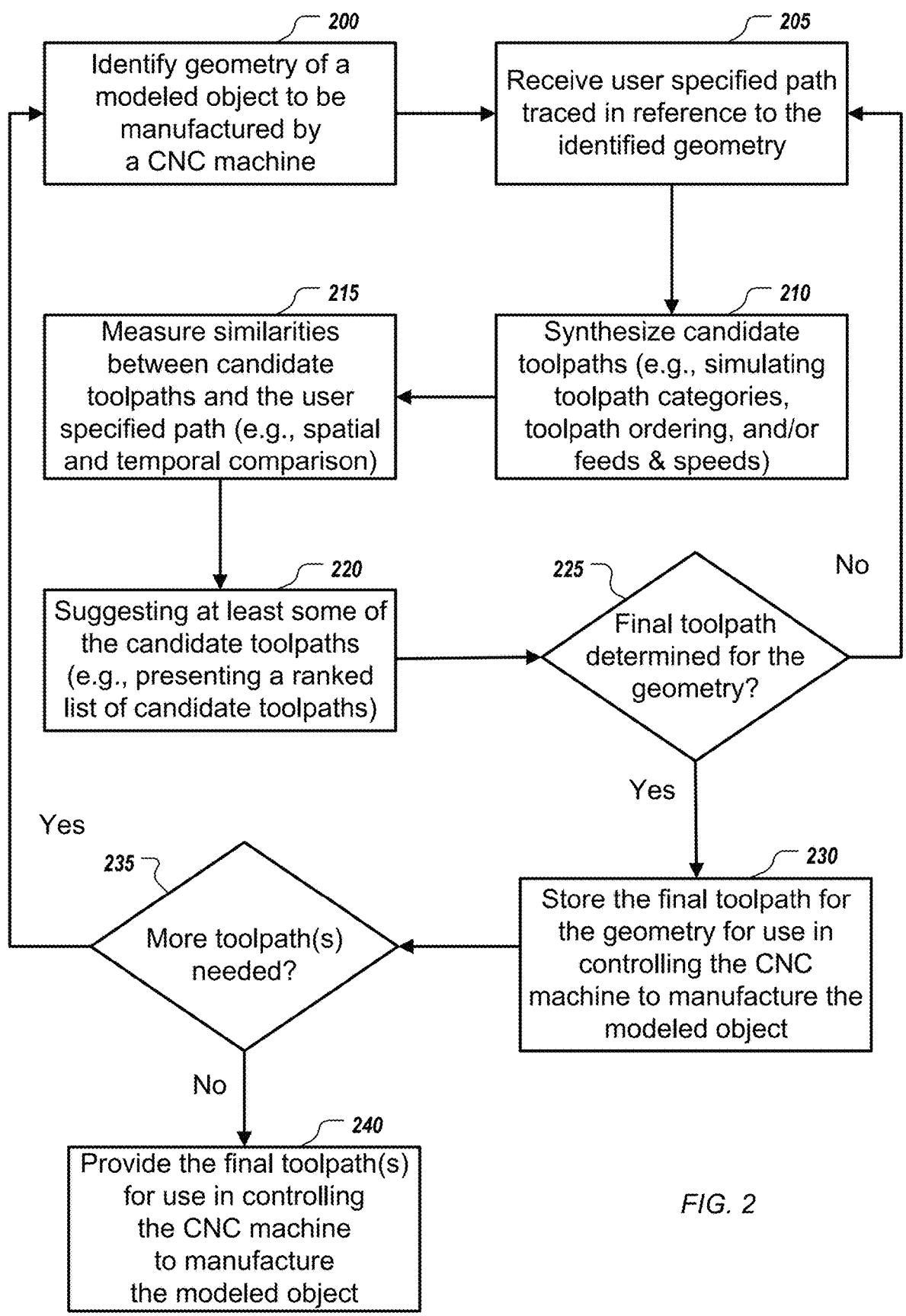
FIG. 2 shows an example of a process to generate toolpaths for use in manufacturing physical structures of modeled objects.

FIG. 2 shows an example of a process to generate toolpaths for use in manufacturing physical structures of modeled objects. Geometry of a modeled object to be manufactured by a CNC machine is identified 200. This can be done automatically by the computer (e.g., by program 116 on computer 110) or by receiving user input. For example the user can select a desired face, contour, or other geometry of a 3D model they are interested in machining. In some implementations, the program provides a user interface in which the user can directly select (e.g., click with a mouse) the geometry (e.g., face or contour) of interest.

A user specified path, traced in reference to the identified geometry, is then received 205. The user specifies the general shape of their desired toolpath by indicating in a general manner how the tool should traverse the geometry. Enabling the user to initially represent a toolpath by demonstration through a user interface allows the user to indicate the desired toolpath directly on the model geometry by demonstrating the path that the tool should take as it traverses the workpiece.

For example, a conventional mouse and display (or touchscreen) can be used to enable a user to demonstrate their desired toolpath by performing it directly on the model by drawing strokes over the surface, where the strokes represent the desired toolpath. In some implementations, the demonstration by the user is enabled through a provided virtual reality environment, allowing the user to directly specify the toolpath in 3D space. Note that the demonstrated toolpath does not have to represent the identical desired toolpath. Rather, the demonstration only needs to be accurate enough to help the computer system sort toolpaths that it generates.

Moreover, the user specified path that is received 205 can be 2D or 3D, and in addition to considering the coordinates of the path (spatial position), the program can consider the ordering of the points and potentially the timing between points, which allows distinctions between a slower tool path and a faster tool path.

In any case, the user specified path that is received 205 is a spatial representation of the desired toolpath to be used by the computer-controlled manufacturing system. Further, the user specified path that is received 205 can also be a temporal representation of the desired toolpath to be used by the computer-controlled manufacturing system. In some implementations, the demonstrated toolpath is captured 205 as a time-series sequence of points in 3D space. If the demonstrated toolpath is performed in 3D (e.g., with a VR setup), the 3D points are captured directly from the user's movement (e.g., with the VR input glove 118*a*). If the demonstrated toolpath is captured in 2D (e.g., on a flat screen), the 3D points are reconstructed from the 2D input by inferring their position using the known intrinsic and extrinsic parameters of the virtual camera for the 2D display space. Such representations allow the demonstrated toolpath to be compared to the subsequently generated candidate toolpaths that are simulated.

Candidate toolpaths are synthesized 210 for the geometry of the modeled object using variations of at least one toolpath parameter. For example, the program 116 can generate and simulate a large set of toolpaths that operate on the geometry (e.g., which has been identified by the user). In some implementations, the toolpath parameter(s) that are varied include a category of toolpath shape, e.g., contour, ramp, horizontal, pencil, scallop, spiral, radial, etc., and the synthesizing 210 includes simulating different toolpath categories for the geometry of the modeled object. Moreover, the generation and simulation of toolpaths can be done in a collaborative manner with the user, where, after a very coarse (and therefore fast) enumeration is performed so as to present the user with different options and rates (e.g., different toolpath categories) from which the user can select the most relevant toolpaths. In addition, different weights can be presented, and a user can then adjust those weights to guide further sampling, with more sampling being done in areas of the search space where the user has assigned higher weights.

In some implementations, the synthesizing 210 includes synthesizing candidate toolpaths by simulating toolpaths from different supported toolpath categories with sampled parameters. For example, to generate the candidate toolpaths, the program 116 can enumerate each of the toolpath categories, and for each toolpath category, the program 116 simulates toolpaths within that category by varying the toolpath operational parameters, e.g., spindle speed, surface speed, ramp spindle speed, cutting feedrate, feed per tooth, lead-in feedrate, lead-out feedrate, ramp feedrate, plunge feedrate, feed per revolution, etc. Thus, the at least one toolpath parameter can be feed and speed parameters for tool operation, and the synthesizing can include simulating 210 use of different values for the feed and speed parameters within at least one toolpath category, and/or the at least one toolpath parameter can be a combination of two or more toolpaths, and the synthesizing can include simulating 210 use of different ordering for the two or more toolpaths using one or more tools and one or more toolpath categories.

In some implementations, the user can fix various parameters, or specify a range to search within to narrow the parameter space and guide the simulation, thereby accelerating the toolpath generation process. Similarly, users can restrict which toolpath categories are considered if they know which categories are and are not of interest. In some implementations, the program 116 synthesizes 210 candidate toolpaths in accordance with the following pseudo code:

```
% Produces a set of parameter values that covers all combinations of parameters
% sampled linearly with 'samplesPerParameter' samples for each parameter in
% the parameter space. At the end, 'allParameterCombinations' contains a set of
% lists, each item in the set is the list of the parameter values for that sample
samplesPerParameter = 10;
for each parameter in parameterSpace:
    for i from 0 to samplesPerParameter:
        parameter.step = (parameter.maxValue -
parameter.minValue) / samplesPerParameter
        parameter.sampledValues.append(parameter.minValue + i *
parameter.step)
    parameter.allPermutations = permute(parameter.sampledValues)
    i = 0
allParameterCombinations = { }
for each value in parameterSpace[0].allPermutations:
    for each parameter in parameterSpace:
        parameterSampling.append(parameter.allPermutations[i])
    i = i + 1
    allParameterCombinations.append(parameterSampling)
```

The simulation process 210 can be parallelized (e.g., multiple programs 116) and/or be performed either on the local computer used to demonstrate the toolpath (e.g., computer 110 or CNC machine 170) or on remote computer(s) (e.g., one or more remote computer systems 150). The parameters can be varied for the simulation based on the CNC machine(s) 170, and tools therefor, that are available for use (e.g., in accordance with user input, CNC machine data encoded in the program 116, data obtained by the program 116 from the connected CNC machine 170, and/or data obtained by the program 116 from other users with similar CNC machines). Moreover, the simulation process 210 can be interactive with the user, where user input triggers simulation of a sparse but representative sample of toolpaths, which are then compared 215 with the user specified path to find the most similar (or a few most similar) candidate toolpaths, after which, the simulation space is narrowed down by adjusting additional parameters based on further user input.

Similarities between the candidate toolpaths and the user specified path are measured 215 by comparing at least a spatial similarity between the candidate toolpaths and the user specified path. The comparison of the user specified path with the generated candidate toolpaths can be done using a number of metrics depending on application or user preference. For example, the spatial trajectories of the paths can be compared using a least square's differencing algorithm, or other algebraic spatial similarity measure. Further, the program 116 can compare candidate toolpaths to the user specified toolpath and rank the candidate toolpaths based on a similarity measure.

Similarity can be measured using a number of path-comparison methods. For instance, demonstrated toolpaths and candidate toolpaths can be normalized to a uniform length and aligned in space (e.g., normalized with respect to the total path size and/or normalized for arc length of the toolpath). Then, the similarity measure can be computed by summing the spatial (Euclidian) distance between corresponding points in 3D space, e.g., using the systems and techniques described in Ding, et al., "Querying and mining of time series data: experimental comparison of representations and distance measures", Proceedings of the VLDB Endowment, 1(2), 1542-1552 (2008). For example, two paths, q and p, can be compared in accordance with the following equation:

$$d(p, q) = d(q, p) = \sqrt{(q_1 - p_1)^2 + (q_2 - p_2)^2 + \ldots + (q_n - p_n)^2}$$
$$= \sqrt{\sum_{i=1}^{n} (q_i - p_i)^2}.$$

Other similarity measures can also be used. For instance, the user may want to emphasize that the curvature of the path is the important feature, and thus the program 116 can allow the user to choose to use a different similarity measure that compares curvature between the two paths, e.g., using the systems and techniques described in Anderson, "Objective surgical skill evaluation" (2010). Other approaches, such as Dynamic Time Warping can be used to account for differences in the relative timing of the two trajectories being compared, e.g., using systems and techniques described in Vaughan, et al., "Comparing and combining time series trajectories using Dynamic Time Warping." Procedia Computer Science 96 (2016): 465-474. Moreover, machine learning systems and techniques can be employed to compare the path similarities, such as by using X, Y, Z time series data points as inputs to a machine learning classifier to determine how similar two toolpaths are.

Thus, as will be appreciated, the user specified path can be a spatial and temporal representation of the desired toolpath to be used by the computer-controlled manufacturing system, and the measuring 215 can include comparing timing of the candidate toolpaths and the user specified path. This allows the user to demonstrate relatives speeds in one or more toolpaths, such as when the user knows that the end-mill of a CNC machine should slow down in a particular location on the workpiece for a certain operation, but then speed up in other location(s)/operation(s). Thus, in some implementations, the measuring 215 includes comparing variations in timing occurring within each respective candidate toolpath to variations in timing occurring within the user specified path. Other types of comparisons are also possible, such as comparing an ordering of two or more toolpaths to make those two or more toolpaths more or less similar to the user specified path. Various other techniques for comparing geometric sequences can also be employed.

In any case, at least some of the candidate toolpaths are suggested 220 based on the measured similarities. Once the similarity is computed, the program 116 can present 220 the resultant candidate toolpaths to the user, with the most likely toolpaths appearing first. Thus, the suggesting 220 can include presenting the candidate toolpaths ranked in order of the measured similarities. In other words, the similarity measure can be used as a sort order for presentation of the candidate toolpaths to the user.

A toolpath is determined 225 for use by the computer-controlled manufacturing system when manufacturing the modeled object, in accordance with user input regarding the presented candidate toolpaths. For example, the user can browse through the candidate toolpaths to select their desired toolpath. When the similarity measure is used as the sort order for presentation of the toolpath options, the most likely candidate toolpaths are at the top of the list, and the user can quickly see the most relevant candidate toolpaths. In any case, from the presented set of candidate toolpaths, the user can select their desired toolpath, which they can further manipulate using traditional toolpath tools and parameter specification. For example, once the user selects a toolpath, the program 116 can populate the traditional user interface for defining toolpaths, exposing all the parameters available for the category of the selected toolpath. In this way, the user still maintains full access to the underlying software and algorithms, and the user can tweak parameters to refine the toolpath until they are satisfied.

If the user is not satisfied with the options, the process can return to user demonstration 205 of a desired toolpath. Once the user is satisfied with the determined toolpath, the final toolpath for the geometry is stored 230 for use in controlling the CNC machine to manufacture the object, e.g., in the file 160 in FIG. 1. Moreover, additional toolpaths can be generated for the identified geometry or for other portions of geometry of the modeled object. Thus, a check 235 can be made to determine if more toolpath(s) are needed, and if so, the process can return to identifying 200 geometry of a modeled object to be manufactured by the CNC machine. Once all the needed toolpath(s) have been specified, the final toolpath(s) can be provided 240 for use in controlling the CNC machine to manufacture the modeled object.

Further, some CNC machines allow for movement of the workpiece in addition to the tool that operates on the workpiece. For example, a multi-axis milling machine can allow both the cutting tool and the bed holding the workpiece to move simultaneously during a milling operation. In some implementations, the user input that is received 205 includes a user specified path for movement, during the manufacturing of the modeled object, of a physical material used to form the modeled object. Thus, the user of a multi-axis CNC milling machine can specify the motion of both the workpiece and the cutting tool that operates on the workpiece. In the context of additive manufacturing, the user can specify the movement of the physical material used to form the modeled object by specifying motion of the print bed (or other machine structure that holds the physical structure of the object as it is built).

In some implementations, the user draws two separate paths for the respective motions of the tool and the material, e.g., through two explicit modes in the user interface, and these separate paths can then be overlaid on a single unified timeline. The user interface can enable manual alignment of timing for the two separate paths in the timeline, as well as adjustment of timing (squashing or stretching) to narrow the search space for candidate toolpaths. Other user input options can also be employed, such as simultaneous demonstration of both paths, e.g., using two VR input gloves 118a, or conversion of a first of the input paths into an animation (e.g., showing movement of the tool or the workpiece in accordance with a first user specified path) followed by receipt 205 of a second of the input paths that the user inputs over the animation (e.g., drawing a toolpath over an animation of movement of the workpiece).

Figure 3:
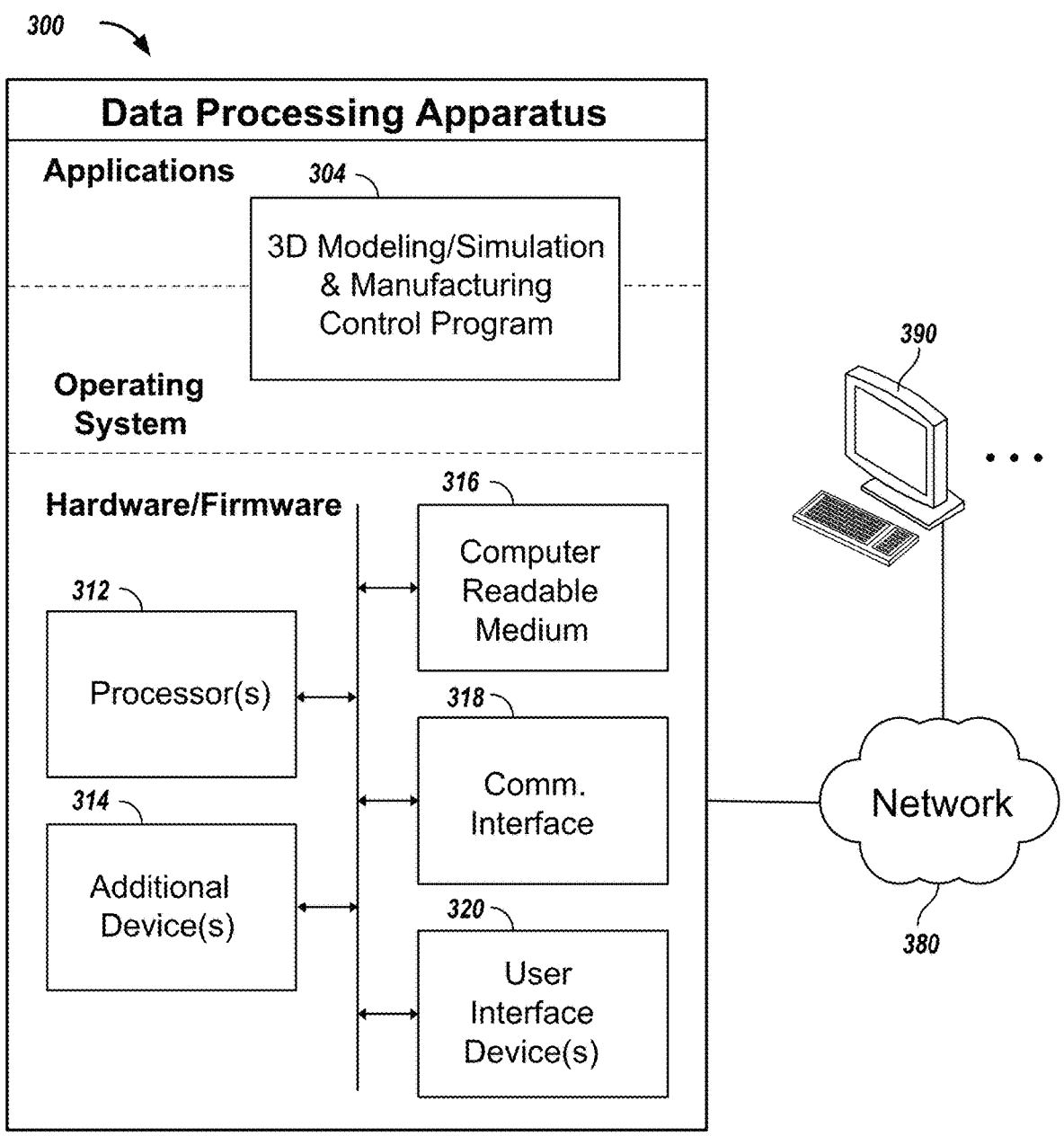
FIG. 3 is a schematic diagram of a data processing system usable to implement the described systems and techniques.

FIG. 3 is a schematic diagram of a data processing system including a data processing apparatus 300, which can be programmed as a client or as a server. The data processing apparatus 300 is connected with one or more computers 390 through a network 380. While only one computer is shown in FIG. 3 as the data processing apparatus 300, multiple computers can be used. The data processing apparatus 300 includes various software modules, which can be distributed between an applications layer and an operating system. These can include executable and/or interpretable software programs or libraries, including tools and services of a 3D modeling/simulation and manufacturing control program 304 that implements the systems and techniques described above. The number of software modules used can vary from one implementation to another. Moreover, the software modules can be distributed on one or more data processing apparatus connected by one or more computer networks or other suitable communication networks.

The data processing apparatus 300 also includes hardware or firmware devices including one or more processors 312, one or more additional devices 314, a computer readable medium 316, a communication interface 318, and one or more user interface devices 320. Each processor 312 is capable of processing instructions for execution within the data processing apparatus 300. In some implementations, the processor 312 is a single or multi-threaded processor. Each processor 312 is capable of processing instructions stored on the computer readable medium 316 or on a storage device such as one of the additional devices 314. The data processing apparatus 300 uses its communication interface 318 to communicate with one or more computers 390, for example, over a network 380. Examples of user interface devices 320 include a display, a camera, a speaker, a microphone, a tactile feedback device, a keyboard, a mouse, and VR and/or AR equipment. The data processing apparatus 300 can store instructions that implement operations associated with the program(s) described above, for example, on the computer readable medium 316 or one or more additional devices 314, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A method comprising:
receiving, in a computer aided design or manufacturing program, a user specified path traced in reference to geometry of a modeled object to be manufactured by a computer-controlled manufacturing system, wherein the user specified path is a spatial representation of a desired toolpath to be used by the computer-controlled manufacturing system;
synthesizing candidate toolpaths for the geometry of the modeled object using variations of at least one toolpath parameter, wherein the at least one toolpath parameter comprises feed and speed parameters for tool operation, and the synthesizing comprises simulating use of different values for the feed and speed parameters within at least one toolpath category;
measuring similarities between the candidate toolpaths and the user specified path, the measuring comprising comparing at least a spatial similarity between the candidate toolpaths and the user specified path;
suggesting at least some of the candidate toolpaths based on the measured similarities; and
determining a toolpath for use by the computer-controlled manufacturing system when manufacturing the modeled object in accordance with user input regarding the at least some of the candidate toolpaths.

2. The method of claim 1, wherein the geometry of the modeled object is a user selected portion of a three dimensional model of the object presented by the computer aided design or manufacturing program.

3. The method of claim 1, wherein the receiving comprises receiving user input through a virtual reality computer system that visualizes the geometry of the modeled object in a three dimensional space of the virtual reality computer system.

4. The method of claim 1, wherein the receiving comprises receiving user input through a display device that represents the geometry of the modeled object in a two dimensional space of the display device.

5. The method of claim 1, wherein the at least one toolpath parameter comprises a category of toolpath shape, and the synthesizing comprises simulating different toolpath categories for the geometry of the modeled object.

6. The method of claim 1, wherein the at least one toolpath parameter comprises a combination of two or more toolpaths, and the synthesizing comprises simulating use of different ordering for the two or more toolpaths using one or more tools and one or more toolpath categories.

7. The method of claim 1, wherein the user specified path is a spatial and temporal representation of the desired toolpath to be used by the computer-controlled manufacturing system, and the measuring comprises comparing timing of the candidate toolpaths and the user specified path.

8. The method of claim 7, wherein the measuring comprises comparing variations in timing occurring within each respective candidate toolpath to variations in timing occurring within the user specified path.

9. The method of claim 1, wherein the measuring comprises comparing an ordering of two or more toolpaths.

10. The method of claim 1, wherein the determining comprises using a user selected one of the at least some of the candidate toolpaths.

11. The method of claim 1, wherein the suggesting comprises presenting the at least some of the candidate toolpaths ranked in order of the measured similarities.

12. The method of claim 1, further comprising receiving, in the computer aided design or manufacturing program, a user specified path for movement, during the manufacturing of the modeled object, of a physical material used to form the modeled object.

13. The method of claim 1, wherein the computer-controlled manufacturing system comprises one or more computer processing apparatus including at least one non-transitory computer-readable medium encoding the computer aided design or manufacturing program.

14. A system comprising:
a data processing apparatus including at least one hardware processor; and
a non-transitory computer-readable medium encoding instructions configured to cause the data processing apparatus to
receive a user specified path traced in reference to geometry of a modeled object to be manufactured by a computer-controlled manufacturing system, wherein the user specified path is a spatial representation of a desired toolpath to be used by the computer-controlled manufacturing system,
synthesize candidate toolpaths for the geometry of the modeled object using variations of at least one toolpath parameter, wherein the at least one toolpath parameter comprises feed and speed parameters for tool operation, and the instructions are configured to cause the data processing apparatus to synthesize the candidate toolpaths by at least being configured to cause the data processing apparatus to simulate use of different values for the feed and speed parameters within at least one toolpath category,
measure similarities between the candidate toolpaths and the user specified path including comparing at least a spatial similarity between the candidate toolpaths and the user specified path,
suggest at least some of the candidate toolpaths based on the measured similarities, and
determine a toolpath for use by the computer-controlled manufacturing system when manufacturing the modeled object in accordance with user input regarding the at least some of the candidate toolpaths.

15. The system of claim 14, wherein the at least one toolpath parameter comprises a category of toolpath shape, and the non-transitory computer-readable medium encodes the instructions configured to cause the data processing apparatus to synthesize the candidate toolpaths by simulating different toolpath categories for the geometry of the modeled object.

16. The system of claim 14, wherein the user specified path is a spatial and temporal representation of the desired toolpath to be used by the computer-controlled manufacturing system, and the non-transitory computer-readable medium encodes the instructions configured to cause the data processing apparatus to measure the similarities between the candidate toolpaths by comparing timing of the candidate toolpaths and the user specified path.

17. The system of claim 14, wherein the non-transitory computer-readable medium encodes the instructions configured to cause the data processing apparatus to receive a user specified path for movement, during the manufacturing of the modeled object, of a physical material used to form the modeled object.

18. The system of claim 14, comprising the computer-controlled manufacturing system used to build a physical structure of the modeled object using the determined toolpath.

19. A non-transitory computer-readable medium encoding instructions operable to cause data processing apparatus to perform operations comprising:

receiving, in a computer aided design or manufacturing program, a user specified path traced in reference to geometry of a modeled object to be manufactured by a computer-controlled manufacturing system, wherein the user specified path is a spatial representation of a desired toolpath to be used by the computer-controlled manufacturing system;

synthesizing candidate toolpaths for the geometry of the modeled object using variations of at least one toolpath parameter, wherein the at least one toolpath parameter comprises feed and speed parameters for tool operation, and the synthesizing comprises simulating use of different values for the feed and speed parameters within at least one toolpath category;

measuring similarities between the candidate toolpaths and the user specified path, the measuring comprising comparing at least a spatial similarity between the candidate toolpaths and the user specified path;

suggesting at least some of the candidate toolpaths based on the measured similarities; and determining a toolpath for use by the computer-controlled manufacturing system when manufacturing the modeled object in accordance with user input regarding the at least some of the candidate toolpaths.

* * * * *